Nov. 29, 1966   H. R. BAERG   3,287,832
PORTABLE PLANETARIUM
Filed Sept. 4, 1962   4 Sheets-Sheet 1

HERBERT R. BAERG
INVENTOR.

BY Lyon & Lyon
ATTORNEYS

Nov. 29, 1966 H. R. BAERG 3,287,832
PORTABLE PLANETARIUM
Filed Sept. 4, 1962 4 Sheets-Sheet 2

HERBERT R. BAERG
INVENTOR.

BY *Lyon & Lyon*
ATTORNEYS

HERBERT R. BAERG
INVENTOR.

BY Lyon & Lyon
ATTORNEYS

HERBERT R. BAERG
INVENTOR.

BY
ATTORNEYS

United States Patent Office 3,287,832
Patented Nov. 29, 1966

3,287,832
PORTABLE PLANETARIUM
Herbert R. Baerg, La Crescenta, Calif., assignor to California Institute Research Foundation, Pasadena, Calif., a corporation of California
Filed Sept. 4, 1962, Ser. No. 221,074
12 Claims. (Cl. 35—45)

This invention relates to portable planetariums; that is, to educational devices which illustrate a portion of the solar system.

Included in the objects of this invention are:

First, to provide a portable planetarium wherein the orbit of each planet is formed in a circular band bearing appropriate indicia concerning movement of the corresponding planet, and defining a path representing the orbit as well as plane of movement of the planet.

Second, to provide a portable planetarium which may be utilized to demonstrate the true day-to-day movements of the Earth and neighboring planets with respect to each other and the Sun.

Third, to provide a portable planetarium which incorporates means whereby the various feasible paths of space probes between planets may be indicated and whereby the daily time periods for line-of-sight observation or tracking of space probes or vehicles may be indicated, demonstrated and explained.

Fourth, to provide a portable planetarium which incorporates means whereby direct distances between planets at various relative positions and their relative angles may be readily measured.

With the above and other objects in view as may appear hereinafter, reference is directed to the accompanying drawings, in which.

Figure 1:
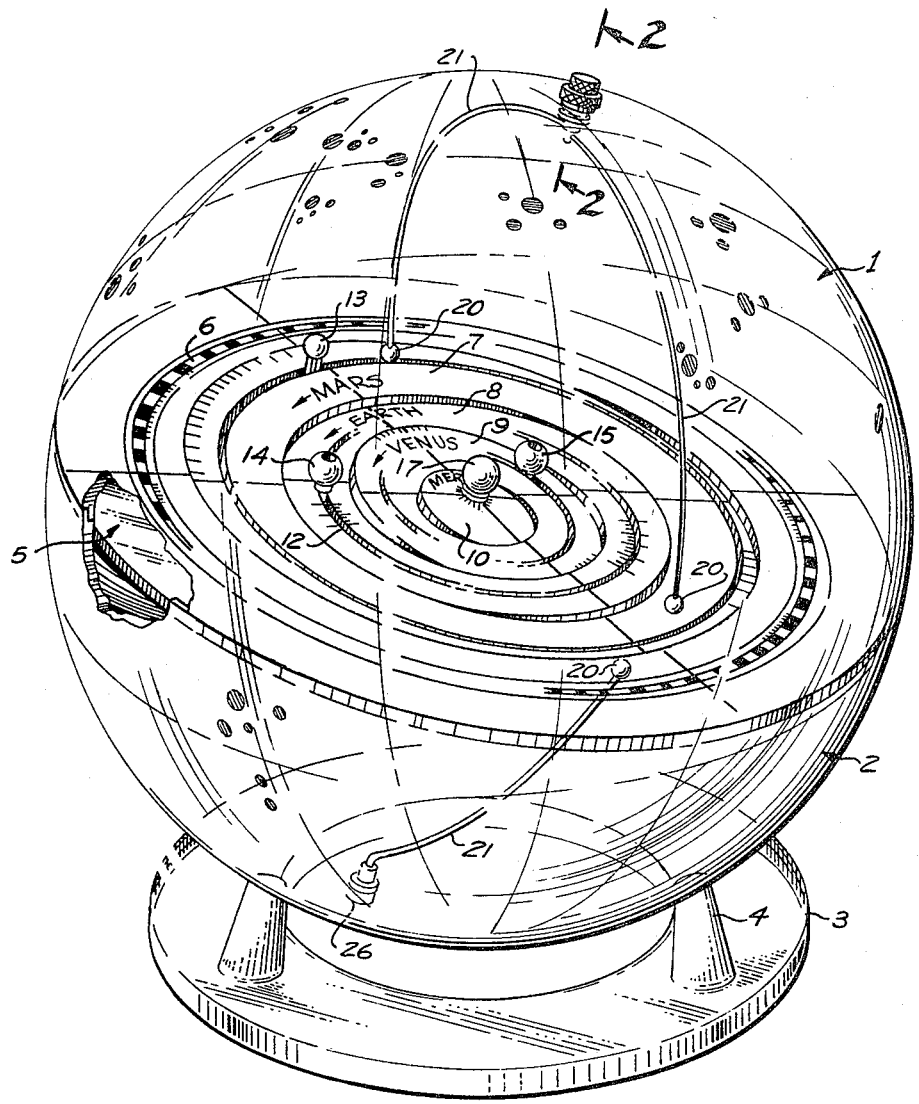
FIGURE 1 is a perspective view of the planetarium set within transparent celestial representing globe.

The planetarium is encased in a transparent celestial globe comprising an upper semi-spherical member 1 and a lower semi-spherical member 2. The lower member is mounted on a base 3 by means of feet 4. The confronting margins of the complementary members are stepped so that one member telescopes slightly into the other. Just below the juncture between these members, there is mounted a planet disk 5 so that the upper celestial globe member 1 may be removed, when desired, leaving the planetarium disk in place.

The upper surface of the planetarium disk forms at its outer margin an ecliptic scale ring 6 on which is formed an ecliptic scale. Immediately within the ecliptic scale ring there is formed a ring 7 disposed in the plane of travel of Mars with respect to the ecliptic ring; that is, the Mars ring is disposed in a plane occupying an angle of 1.9° with respect to the ecliptic scale ring. Similarly within the Mars ring 7 is a third ring 8 embracing the path of movement of the Earth and defining a reference surface in the plane of the ecliptic ring 6. Within the Earth ring 8 is a ring 9 representing the plane of travel of the planet Venus and disposed at an angle of 3.4° with respect to the ecliptic scale ring. Within the Venus ring 9 is a central disk representative of the plane of travel of the planet Mercury and disposed at an angle of 7° with respect to the ecliptic ring.

The Mars, Earth and Venus rings 7, 8 and 9 and the Mercury disk 10 are provided with circular slots 12 representative of the paths followed by Mars, Earth, Venus and Mercury respectively. The slots 12 are preferably T slots. Alternatively a ring of closely spaced sockets may be provided.

Small spheres are employed to represent the planets, preferably two corresponding to each planet so as to show positions of a planet spaced in time. Thus the rings 7, 8 and 9 utilize Mars spheres 13, Earth spheres 14, Venus spheres 15 and Mercury spheres 16 respectively. Appropriately located in the central portion of the Mercury disk 11 is a Sun sphere 17. Each of the Mars, Earth, Venus and Mercury spheres is provided with a short T stem 18 which fits within corresponding orbit slot 12 and at its upper or diametrically opposed end is provided a socket 19. If a series of sockets are utilized in place of orbit slots 12, small pegs may be substituted for the T stems 18.

The various spheres may vary in diameter to suggest the difference in size of the planets; however, the distance between the top of each sphere and the underlying ring is the same for all phases including the sun sphere. This feature enables angular measurements with respect to the ecliptic plane to be made by use of the upper ends of the spheres.

Figure 2:
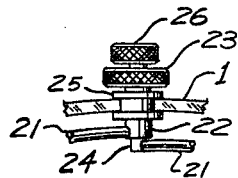
FIGURE 2 is a fragmentary, sectional view taken through 2—2 of FIGURE 1.
Figure 3:
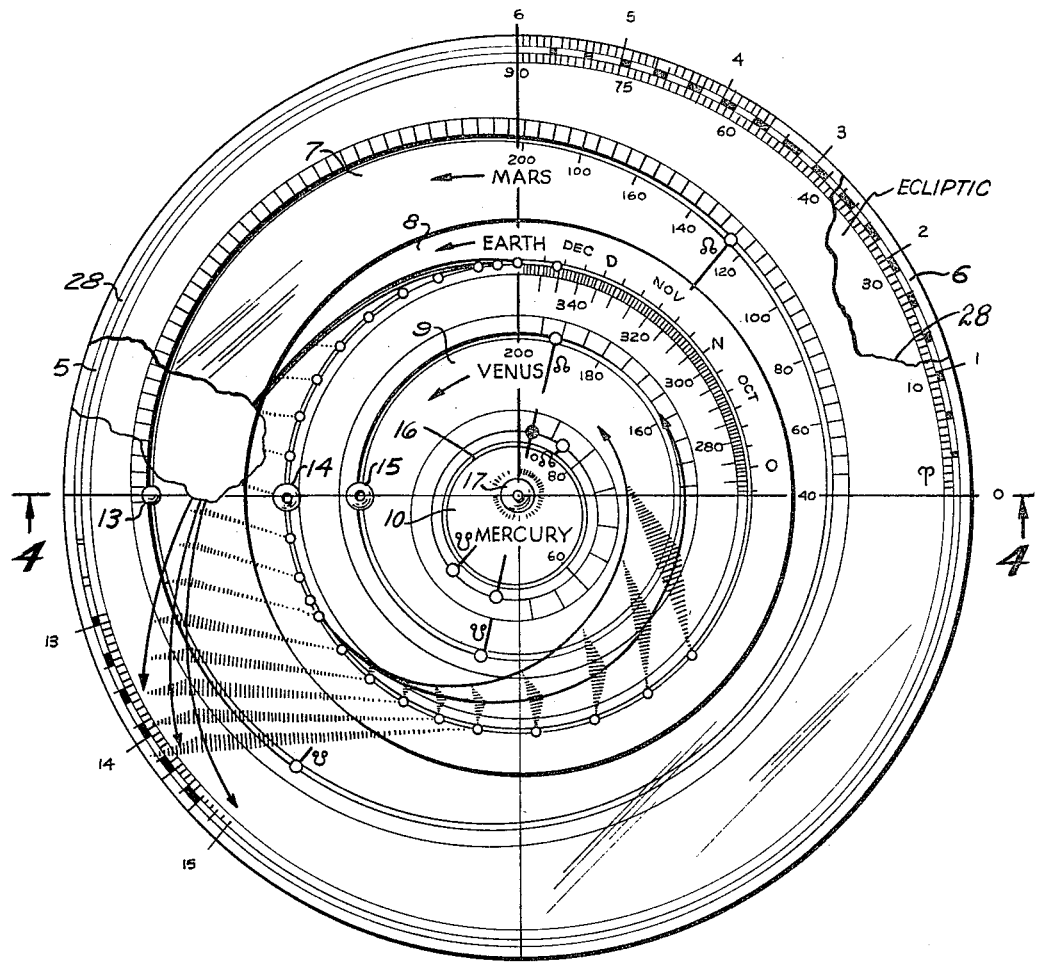
FIGURE 3 is a plan view of the planetarium structure with the surrounding globe omitted, on which is superimposed a chart to indicate, by way of example, several feasible paths of travel between the Earth and Mars and between the Earth and Venus.
Figure 4:
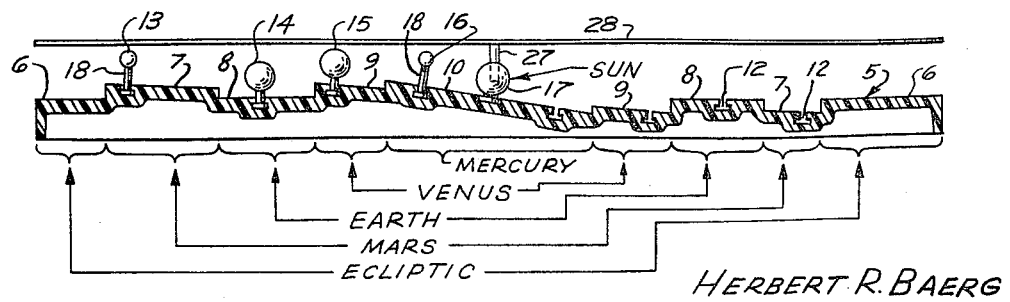
FIGURE 4 is a sectional view taken through 4—4 of FIGURE 3 showing the construction of the planetarium tracking rings.

It is also desirable for some purposes to utilize externally accessible spheres 20 representative of one or more of the planets. Each sphere 20 is connected to a wire support 21 which is essentially in the form of a quarter circle. If more than one wire and sphere are employed, one wire is connected to a shaft 22. The shaft projects through the upper or lower complementary globe member and is provided with an external knob 23. Additional wire supports are connected to corresponding sleeves 24 as suggested in FIGURE 2. The shaft 22 and the one or more of the sleeves which may be used are mounted in a journal bushing 25. The sleeve or sleeves are provided with external knobs 26. By rotating the knobs 23 and 26 the positions of the spheres 20 may be adjusted.

For purposes of indicating possible trajectories between the various planets, for example, between the Earth and Mars or Venus, the socket formed in the Sun representing sphere 17 receives a pin 27 which supports a flat circular trajectory chart 28 formed of plastic material. The trajectory chart overlies the planetarium disk 5. Printed or otherwise formed on the trajectory charts are representative paths. In the drawings, these paths are shown as proceeding from the Earth to Mars and to Venus. Also printed on the chart may be a multiplicity of successive positions of the planets involved or other information.

Figure 8:
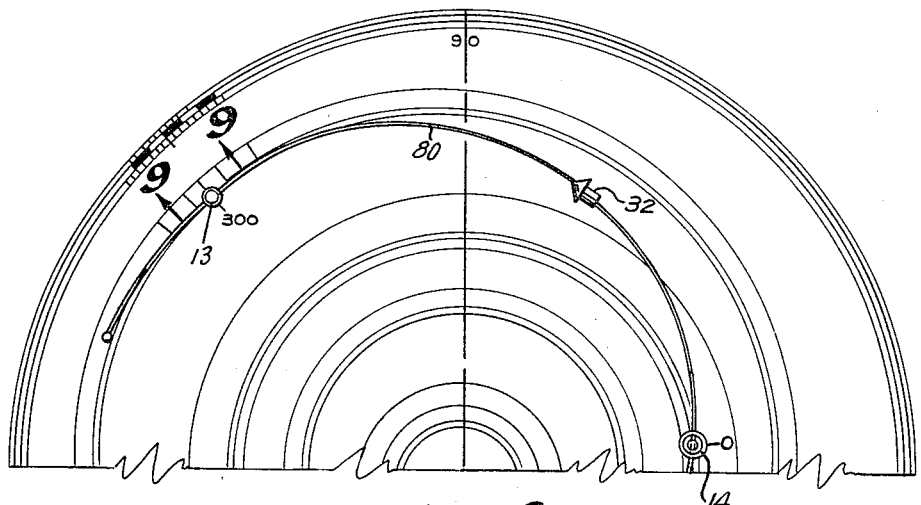
FIGURE 8 is a fragmentary, plan view similar to FIGURE 2 showing a means for forming a track representative of a selected path of travel between, for example, the Earth and Mars wherein a space probe or vehicle is graphically represented on the track in correspondence with actual or theoretical movement of a space probe or vehicle.
Figure 9:
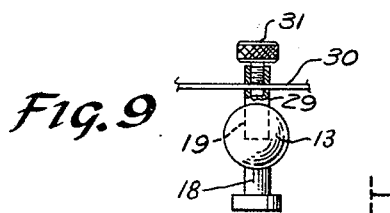
FIGURE 9 is a fragmentary, sectional view through 9—9 of FIGURE 8.

An alternative for indicating a trajectory between the planets, for example, between Earth and Mars is indicated in FIGURES 8 and 9. In this case a slide pin 29 fits into a socket 19. The slide pin is provided with a transverse bore which receives a wire 30. The wire may be held in any adjusted position by a set screw 31. The wire 30 is preferably formed of spring metal so that it may be bent, without permanent deformation, to represent a flight path between selected planets. By securing the set screws the wire may be held in the proper curvature. If desired, a sleeve may fit slidably on the wire and be shaped to symbolize a space probe or vehicle 32.

Figure 5:
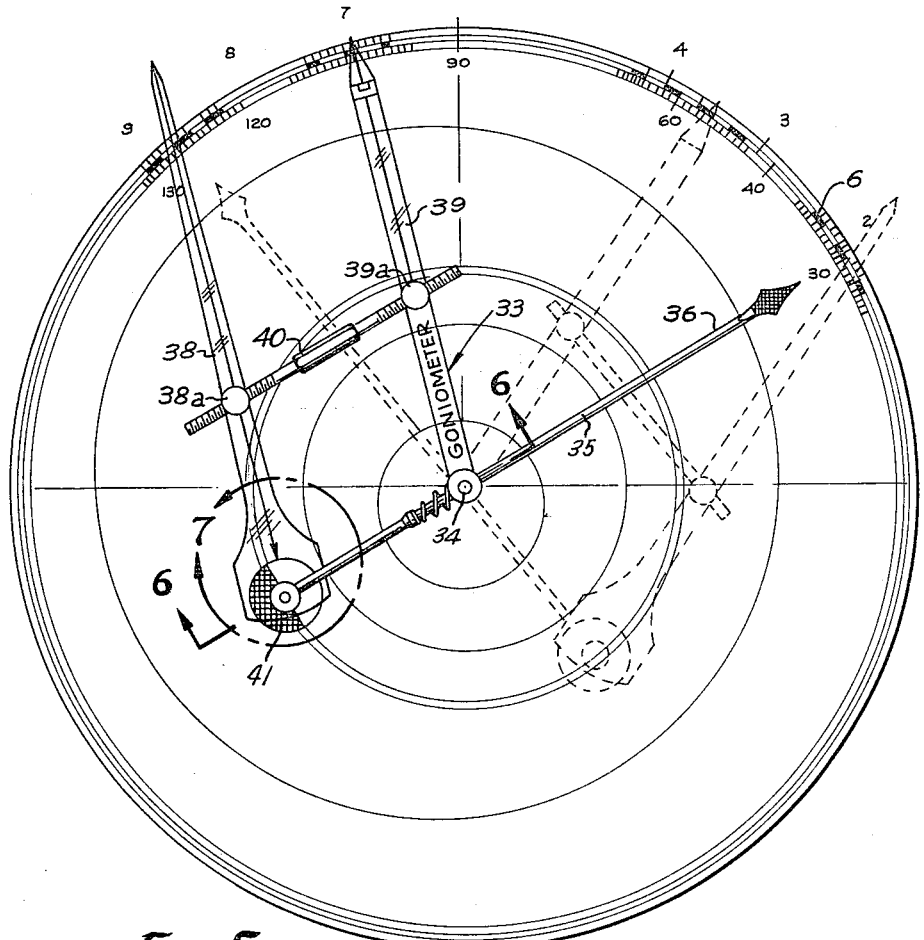
FIGURE 5 is a plan view of the planetarium structure similar to FIGURE 3 showing a goniometer mounted thereon for indicating angular positions of the Sun or a planet with respect to the Earth or other selected planets, and star background.
Figure 6:
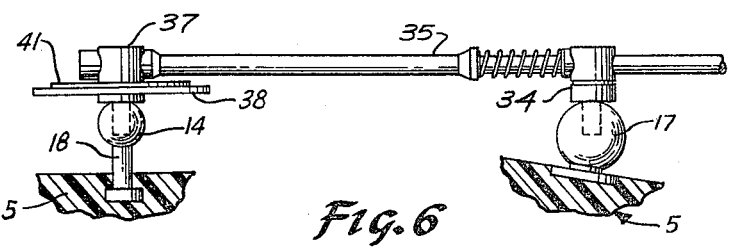
FIGURE 6 is an enlarged, fragmentary, sectional view of the goniometer taken through 6—6 of FIGURE 5.
Figure 7:
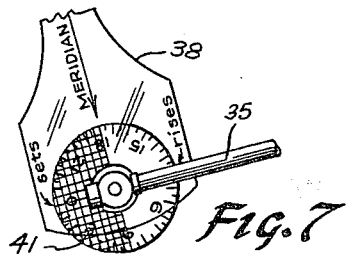
FIGURE 7 is an enlarged, fragmentary plan view thereof taken within circle 7 of FIGURE 5.

It is desirable to measure angular relation between the planets and the Sun or different planets under different conditions. This is accomplished by a goniometer 33 shown in FIGURES 5, 6 and 7. The goniometer includes a slide pin 34 which fits into the Sun sphere socket or socket of a selected planet. Extending slidably and transversely through the slide pin is a radius shaft 35, one end of which is provided with a pointer 36 which cooperates with the ecliptic scale on the ring 6.

The other end of the radius shaft is provided with a pin 37 which may be inserted in a selective planet sphere. Mounted on the pin is a planet oriented pointer 38 which may be employed to point in the apparent direction of the Sun. A Sun oriented pointer 39 is carried by the slide pin 34.

The pointers 38 and 39 are provided with journal members 38a and 39a, respectively, which are provided with transverse screwthreaded bores adapted to receive the ends of an adjustment bar 40. The ends of the adjustment bar have screwthreads of opposite pitch so that by rotation of the bar, the axes of the pointers may be brought into parallelism to compensate for the ecliptic path of travel of the planet about the Sun. Rotatably mounted on the planet pin 37 is a disk 41 which serves to indicate day and night condition when used in reference to appropriate indicia marked on the pointer 38.

Figure 11:
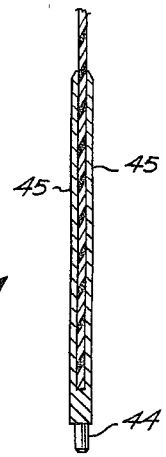
FIGURE 11 is a sectional view taken through 11—11 of FIGURE 10.
Figure 10:
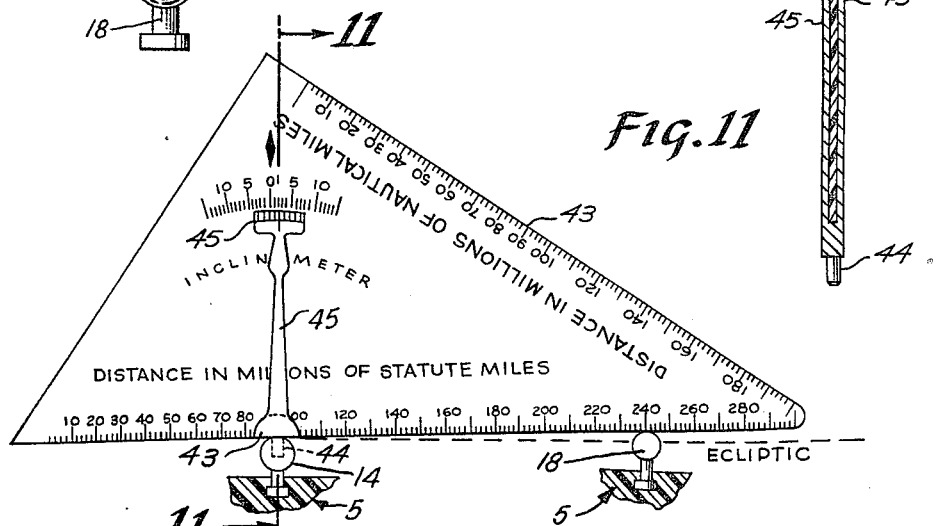
FIGURE 10 is a side view of an inclinometer and rule with a measurement of distance between planets or the planet and the Sun, two portions of the planet tracks being indicated fragmentarily.

Another tool useful in connection with the planetarium is an inclinometer 43 shown in FIGURES 10 and 11 in the form of a triangle formed of plastic material, selected edges of which also serve as linear measuring means.

A semicircular recess is formed in one edge of the triangle which receives a semicircular hub 43a having a diametrical face from which extends a pin 44 for insertion in a planet sphere or the Sun sphere. Pointer arms 45 extend upwardly at either side of the plate member for cooperation with inclinometer scales which indicate angular relation between planet spheres when the appropriate margin of the planetarium member is set on a second planet representing sphere.

Having thus described certain embodiments of my invention, I do not wish to be limited thereto but desire to include in the scope of my invention all novelty inherent in the appended claims.

I claim:
1. A planetarium device, comprising:
 (a) a circular disk structure having a series of bands of progressively increasing radius exposed throughout their circumference and disposed in various angularly related plates corresponding to the planes in which selected planets orbit about the Sun; each band including means defining an orbit path of the corresponding planet and indicia bordering said orbit path means relating to the movement of said planet therein;
 (b) a Sun symbolizing means at the center of said disk structure;
 (c) and planet representing means movable about said orbit path means.

2. A planetarium device, comprising:
 (a) a circular disk structure having a series of bands of progressively increasing radius, exposed throughout their circumference and disposed in various angularly related planes corresponding to the planes in which selected planets orbit about the Sun; each band including means defining an orbit path of the corresponding planet and indicia bordering said orbit path means relating to the movement of said planet therein;
 (b) a Sun symbolizing means at the center of said disk structure;
 (c) planet representing means movable about said orbit path means;
 (d) and a transparent celestial globe enveloping said disk.

3. A planetarium device, comprising:
 (a) a circular disk structure having a series of bands of progressively increasing radius exposed throughout their circumference and disposed in various angularly related planes corresponding to the planes in which selected planets orbit about the Sun; each band including means defining an orbit path of the corresponding planet and indicia bordering said orbit path means relating to the movement of said planet therein;
 (b) a Sun symbolizing means at the center of said disk structure;
 (c) planet representing means movable about said orbit path means;
 (d) a transparent celestial globe enveloping said disk;
 (e) externally accessible handle means carried by said globe and disposed on an axis approximately perpendicular to said disk structure; and pointer elements within said globe and having ends movable in the proximity to selected orbit path means.

4. A planetarium device, comprising:
 (a) a circular disk structure having a series of bands of progressively increasing radius, exposed throughout their circumference and disposed in various angularly related planes corresponding to the planes in which selected planets orbit about the Sun; each band including means defining an orbit path of the corresponding planet and indicia bordering said orbit path means relating to the movement of said planet therein;
 (b) a Sun symbolizing means at the center of said disk structure;
 (c) planet representing means movable about said orbit path means;
 (d) means for representing space probe flight paths between selected planets;
 (e) means for securing said flight path means to said selected planet representing means;
 (f) and means representing a space probe movable along said flight path means.

5. A planetarium device, comprising:
 (a) a circular disk structure having a series of bands of progressively increasing radius, exposed throughout their circumference and disposed in various angularly related planes corresponding to the planes in which selected planets orbit about the Sun; each band including means defining an orbit path of the corresponding planet and indicia bordering said orbit path means relating to the movement of said planet therein;
 (b) a Sun symbolizing means at the center of said disk structure;
 (c) planet representing means movable about said orbit path means;
 (d) and a transparent disk adapted to be mounted over said disk structure, said transparent disk having indicia representative of various space probe flight paths between selected planets.

6. A planetarium device, comprising:
(a) a circular disk structure including a series of upwardly facing circular bands exposed throughout their circumference and representing zones containing the orbits of selected planets with respect to the Sun, the planes of said bands being angularly displaced in correspondence to the displacement of the planets represented, each band having an upwardly facing groove exposed throughout its circumference and defining the orbit of the corresponding plane, indicia means bordering said grooves to illustrate the movements of said planets, and a peripheral ring having a band concentric with the center of said disk bearing indicia to illustrate the ecliptic;
(b) means representative of the Sun at the center of said disk structure;
(c) and means representative of said selected planets movable about said grooves.

7. A planetarium device, comprising:
(a) a circular disk structure including a series of upwardly facing circular bands exposed throughout their circumference and representing zones containing the orbits of selected planets with respect to the Sun, the planes of said bands being angularly displaced in correspondence to the displacement of the planets represented, each band having an upwardly facing groove exposed throughout its circumference and defining the orbit of the corresponding plane, indicia means bordering said grooves to illustrate the movements of said planets, and a peripheral ring having a band concentric with the center of said disk bearing indicia to illustrate the ecliptic;
(b) means representative of the Sun at the center of said disk structure;
(c) means representative of said selected planets, movable about said grooves;
(d) means attachable to selected planet representing means for indicating paths of flight therebetween;
(e) and a spacecraft representing means movable along said path of flight indicating means.

8. A planetarium device, comprising:
(a) a base;
(b) a hollow, transparent celestial globe supported on said base, and including separable upper and lower parts;
(c) a circular disk structure secured in said lower part, and including a series of essentially concentric rings exposed throughout their circumference and disposed in planes corresponding to the orbital planes of a selected set of planets and circular orbit tracks in said rings corresponding to the orbits of said selected set of planets, scale indicia bordering said orbit tracks, and other scale indicia adjacent the periphery of said disk structure and walls of said globe to illustrate the ecliptic;
(d) means representative of the Sun above the center of said disk structure and coinciding with the center of said globe;
(e) and means movable in said orbit tracks including planet representing elements disposed above said tracks.

9. A planetarium device, comprising:
(a) a base;
(b) a hollow, transparent celestial globe supported on said base, and including separable upper and lower parts;
(c) a circular disk structure secured in said lower part, and including a series of essentially concentric rings disposed in planes corresponding to the orbital planes of a selected set of planets and circular orbit tracks in said rings corresponding to the orbits of said selected set of planets, scale indicia bordering said orbit tracks, and other scale indicia adjacent the periphery of said disk structure and walls of said globe to illustrate the ecliptic;
(d) means representative of the Sun above the center of said disk structure and coinciding with the center of said globe;
(e) means movable in said orbit tracks including planet representing elements disposed above said tracks;
(f) concentric handle means journalled in said globe on an axis passing through said disk structure perpendicular to the plane of the periphery thereof;
(g) arcuate arms extending from said handle means into proximity to said disk structure and rotatable in essentially the paths of travel of selected planets;
(h) and planet representing means on the extremities of said arms.

10. A planetarium device, comprising:
(a) a circular disk structure including a series of peripherally connected rings exposed throughout their circumferences and disposed in planes corresponding to the orbital planes of a selected set of planets and defining zones containing the orbital paths of said planets and circular orbit tracks in said rings corresponding to the orbital paths of said planets, scale indicia bodering said orbit tracks, and an ecliptic scale indicia adjacent the periphery of said disk structure;
(b) means representative of the Sun above the center of said disk structure;
(c) and means retained by and movable along said orbit tracks including planet representing elements disposed above said tracks.

11. A planetarium device, comprising:
(a) a circular disk structure including a series of peripherally connected rings exposed throughout their circumferences and disposed in planes corresponding to the orbital planes of a selected set of planets and defining zones containing the orbital paths of said planets, and circular orbit tracks in said rings corresponding to the orbital paths of said planets, scale indicia bordering said orbit tracks, and an ecliptic scale indicia adjacent the periphery of said disk structure;
(b) means representative of the Sun above the center of said disk structure;
(c) means retained by and movable along said orbit tracks including planet representing elements disposed above said tracks;
(d) a flat transparent plate supported on said Sun representing means over said disk structure;
(e) and indicia on said plate representing space vehicle trajectories between selected planets.

12. A planetarium device, comprising:
(a) a circular disk structure including a series of concentric rings disposed in planes corresponding to the orbital planes of a selected set of planets and circular orbit tracks in said rings corresponding to the orbits of said selected set of planets, scale indicia bordering said orbit tracks, and an ecliptic scale indicia adjacent the periphery of said disk structure;
(b) means representative of the Sun above the center of said disk structure and coinciding with the center of said globe;
(c) means movable in said orbit tracks including planet representing elements disposed above said tracks;
(d) and a goniometer, including mounting pins for attachment to the Sun representing member and a selected planet, an ecliptic scale pointer extending between said pins and radially beyond said Sun representing means to said ecliptic scale, a planet orienting pointer extending from said planet representing means, a Sun oriented pointer, and means for disposing said planet and Sun oriented pointers in parallelism.

(References on following page)

References Cited by the Examiner

UNITED STATES PATENTS

| | | | |
|---|---|---|---|
| 268,512 | 12/1882 | McDonough | 35—45 |
| 279,439 | 6/1883 | Rupert | 35—45 |
| 327,631 | 10/1885 | Whitcomb | 35—45 |
| 336,280 | 2/1886 | Bailey | 35—45 |
| 448,075 | 3/1891 | Rassweiler | 35—45 |
| 926,064 | 6/1909 | Keller | 35—45 |
| 1,093,024 | 4/1914 | App | 35—45 |
| 1,189,141 | 6/1916 | Lanneau | 35—45 |
| 1,730,852 | 10/1929 | Jonny | 235—61 |
| 1,952,024 | 3/1934 | Russert | 35—47 |
| 2,399,365 | 4/1946 | Link | 35—47 |
| 2,890,537 | 6/1959 | Benko | 35—46 X |
| 3,005,270 | 10/1961 | Musser | 35—45 |
| 3,029,528 | 4/1962 | Verson | 35—45 |
| 3,035,356 | 5/1962 | Musser | 35—45 |

FOREIGN PATENTS 240,604    10/1925    Great Britain.

EUGENE R. CAPOZIO, *Primary Examiner.*

JEROME SCHNALL, *Examiner.*

H. S. SKOGQUIST, *Assistant Examiner.*